United States Patent [19]

Tippin

[11] Patent Number: 5,176,222
[45] Date of Patent: Jan. 5, 1993

[54] HOOF PICK TOOL

[76] Inventor: Steven R. Tippin, 23660 Suttle Rd., Veneta, Oreg. 97487

[21] Appl. No.: 698,816

[22] Filed: May 13, 1991

[51] Int. Cl.⁵ .................. A01L 15/00; A01L 11/00
[52] U.S. Cl. ........................................ 168/48.1; 7/118
[58] Field of Search ............... 168/45, 48.1; 30/161, 30/164.7; 7/118, 119

[56] References Cited

U.S. PATENT DOCUMENTS

| | | | |
|---|---|---|---|
| 436,659 | 9/1890 | Harris | 7/118 |
| 544,540 | 8/1895 | Jones | 168/48.1 X |
| 632,792 | 9/1899 | Schmidt | 7/119 |
| 4,187,607 | 2/1980 | Simuro et al. | 168/48.1 X |

*Primary Examiner*—Robert P. Swiatek
*Attorney, Agent, or Firm*—James D. Givnan, Jr.

[57] ABSTRACT

A tool is disclosed for the cleaning of horse' hooves with the tool including a hoof pick pivotally attached to one end of a handle. The hoof pick, when positioned adjacent the handle, defines with the handle an open area through which may pass a tool supporting belt or belt loop enabling convenient attachment to the person. A flexible retainer restrains the hoof pick in both an open position and a closed position. A lock acting on the retainer prevents retainer movement and hence movement of the hoof pick. A finger actuated release disengages the lock from the retainer permitting hoof pick positioning toward and away from the tool handle.

6 Claims, 1 Drawing Sheet

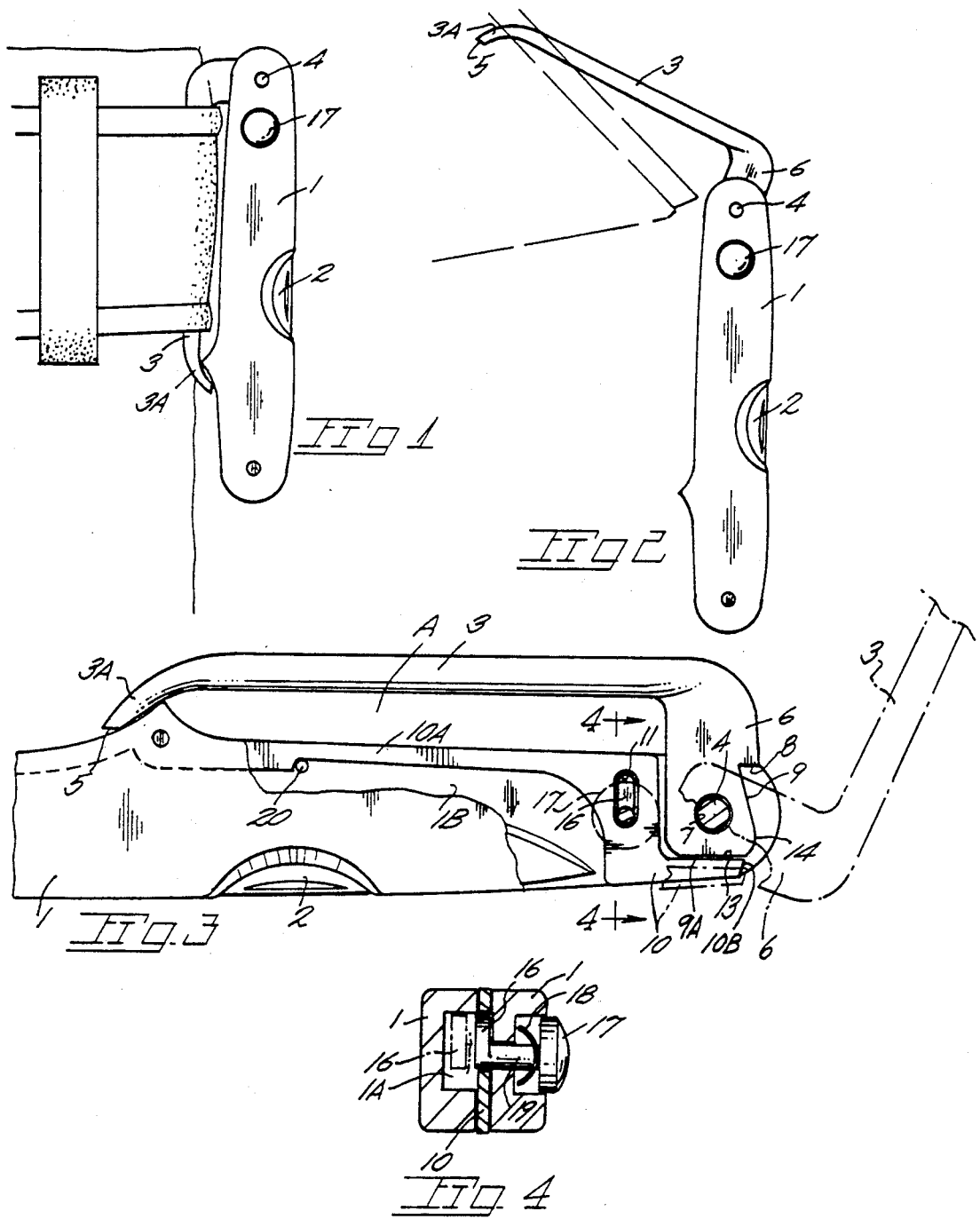

HOOF PICK TOOL

BACKGROUND OF THE INVENTION

The present invention concerns hand tools of the type which may be conveniently carried on the person.

To provide ready access to repeatedly used hand tools the same are often carried on a belt attached hook or in a scabbard. A common tool used by those who work with horses is a hoof pick which typically is of a size and shape not conveniently carried on the person.

The present invention is embodied in a hoof pick tool which has a positionable pick permitting convenient carrying on the person.

The hoof pick, when folded, is laterally offset from a main body or handle of the tool to receive a belt, belt loop, etc. A lock retains the hoof pick tool in both operative as well as folded configuration.

The handle of the tool preferably includes a knife blade or blades. The hoof pick has a curved end segment which closes against the tool handle to provide a closed space for reception of a belt or other tool support on the user. A lock prevents all but intentional opening of the tool.

Important objectives of the present tool include the provision of a hoof pick pivotally attached to a tool handle which when closed defines an area for the reception of the user's belt or belt loop; the provision of a hand tool wherein the hoof pick component additionally serves as a keeper for attaching the tool to the user's attire in a convenient manner; the provision of a hoof pick in a lockable, pivoted connection to a handle which additionally includes a blade or blades.

BRIEF DESCRIPTION OF THE DRAWINGS

In the drawings:

FIG. 1 is an elevational view of the hoof pick in place on the person;

FIG. 2 is an elevational view of the hoof pick opened for cleaning a hoof;

FIG. 3 is a fragmentary side elevational view of the hoof pick tool with parts broken away for purposes of illustration, and FIG. 4 is a vertical sectional view taken along line 4—4 of FIG. 3.

DETAILED DESCRIPTION OF THE PREFERRED EMBODIMENTS

With continuing reference to the drawings wherein applied reference numerals indicate parts similarly hereinafter identified, the reference numeral 1 indicates a handle of the present tool.

Handle 1 may also be a knife handle of the type having a pivoted or folding knife blade 2 in a handle cavity defined by walls as at 1B.

A hoof pick at 3 is pivotally attached to handle 1 by a pivot pin 4 at one end of elongate handle 1. Hoof pick 1 terminates at a distal end in a curved end segment 3A having an end 5. The remaining or proximal end at 6 of the hoof pick is of blade or flat configuration and apertured at 7 to receive pivot pin 4. Pick end 6 has a shoulder 9 which is positionable into abutting contact with a later described retainer arm. An edge 9 of the pick additionally comes into abutting engagement with the later described retainer arm. Accordingly provision is made for securely locking the hoof pick 3 in an open, operable position as shown in FIGS. 2 and 3.

A retainer mechanism for the hoof pick includes a retainer arm 10 having an aperture 11 therein. An arm edge 13 abuts an edge 9A of the hoof pick to maintain the latter in the closed configuration shown in FIG. 1 and in FIG. 3 whereat the hoof pick constitutes a means for attaching the present tool to the person. Retainer arm 10 includes a flexible segment at 10A which may yield in response to intentional manual opening and closing movement of the hoof pick at which times a cam surface 14 on the hoof pick rides along edge 13 of the arm. Accordingly the hoof pick is lockable in both the open and closed positions by the action of arm surface 13 abutting the pick edges 9 and 9A. To lock arm 10 against movement, and hence the hoof pick against opening and closing movement, a lock or detent at 16 is provided which normally occupies arm aperture 11. Handle 1 is formed with internal open area at 1A to permit lateral displacement of lock 16 out of arm opening 11 to permit the arm to flex during opening and closing movement of the hoof pick. Lock displacement is achieved by finger actuation of a push button 17 spring biased at 18 by a spring member such as a spring washer. A shank 19 joins push button 17 to lock or detent 16. In the absence of fingertip pressure on push button 17, the lock 16 occupies aperture 11 to prevent arm movement. A pin 20 is a fulcrum for arm 10.

In use, the present tool is attached to a supporting member such as a belt or belt loop by insertion of the hoof pick 3 therethrough whereupon actuation of push button 17 permits the hoof pick handle 1 to be swung to a closed position to define an area at A between a major segment of the pick and the handle in which is confined the user's belt or other supporting member. Conversely, removal of the present hoof pick tool is by actuation of push button 17 permitting upward opening movement of the handle 1 away from the hoof pick to permit subsequent withdrawal of the hoof pick away from the supporting article. Opening movement is limited by hoof pick shoulder 8 engaging arm end 108.

While I have shown but one embodiment of the hoof pick tool, it will be apparent to those skilled in the art that the invention may be embodied still otherwise without departing from the spirit and scope of the invention.

Having thus described the invention, what is desired to be secured by a Letters Patent is:

I claim:

1. A hoof pick tool comprising in combination,
   an elongate hoof pick,
   a handle,
   pivot means attaching an end of said hoof pick to said handle,
   said hoof pick having substantially its entire length laterally offset from the handle when in a stowed first position to define with said handle an open area for the reception of a tool supporting article, said hoof pick swingable about said pivot means away from said handle to an operable second position, said hoof pick having a distal end for contact with said handle when in said first position; and
   retainer means operable to lock the hoof pick in at least one of said positions.

2. The tool claimed in claim 1 wherein said retainer means includes a flexible arm member, a push button lock, a spring biasing said lock into locking engagement with said flexible arm member.

3. The tool claimed in claim 2 wherein said arm member defines an aperture for reception of said lock, said lock including a push button to permit displacement of the lock out of said aperture to permit arm flexure and arcuate opening movement of the hoof pick.

4. The tool claimed in claim 1 wherein said hoof pick has a curved distal end segment for abutting engagement with said handle when in said stowed first position to confine the tool supporting article in said open area.

5. A hand tool for attachment to user's belt, said tool comprising,
    a handle of elongate configuration,
    a tool component of elongate shape with a distal end segment and a proximal end,
    pivot means coupling one end of said tool component to said handle,
    said tool having a first position whereat said distal end segment is in abutment with said handle,
    said tool component having a major segment offset from said handle when in said first position to define an elongate open area therewith for the passage of the user's belt, said proximal end defining one end of said open area,
    said tool component having a second position whereat the tool component is swung to a position whereat said distal end segment is remote from said handle and in an operative position, and
    retainer means including a lock operable to lock the tool component in at least one of said positions.

6. The hand tool claimed in claim 5 wherein said retainer means includes a flexible member in engagement with the tool component, a lock engageable with said flexible member to lock same against flexing and hence said tool component against movement.

* * * * *